(12) United States Patent
Tzou et al.

(10) Patent No.: US 10,627,871 B2
(45) Date of Patent: Apr. 21, 2020

(54) EXPANSION MODULE AND ELECTRONIC DEVICE

(71) Applicants: Jyh-Chyang Tzou, Taipei (TW); Tsai-Yu Lin, Taipei (TW); Hsin Yeh, Taipei (TW); Wei-Hao Lan, Taipei (TW); Yuan-Ping Chu, Taipei (TW)

(72) Inventors: Jyh-Chyang Tzou, Taipei (TW); Tsai-Yu Lin, Taipei (TW); Hsin Yeh, Taipei (TW); Wei-Hao Lan, Taipei (TW); Yuan-Ping Chu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/280,060

(22) Filed: Feb. 20, 2019

(65) Prior Publication Data

US 2019/0332145 A1    Oct. 31, 2019

(30) Foreign Application Priority Data

Apr. 26, 2018 (TW) .............................. 107114153 A (51) Int. Cl.
*H05K 5/00* (2006.01)
*G06F 1/16* (2006.01)
*F16M 11/06* (2006.01)

(52) U.S. Cl.
CPC ............ *G06F 1/166* (2013.01); *G06F 1/1632* (2013.01); *G06F 1/1683* (2013.01); *F16M 11/06* (2013.01)

(58) Field of Classification Search
CPC ....................................................... H05K 5/00
See application file for complete search history.

(56) References Cited

U.S. PATENT DOCUMENTS 6,515,852 B2 *   2/2003   Huang ................... G06F 1/1626
                                                    235/145 R
8,498,100 B1 *   7/2013   Whitt, III .............. G06F 1/1618
                                                    361/679.17

(Continued)

FOREIGN PATENT DOCUMENTS

CN        2648490      10/2004
CN        101296595    10/2008
TW        201643601    12/2016

OTHER PUBLICATIONS

"Office Action of Taiwan Counterpart Application," dated Feb. 26, 2019, p. 1-p. 15.

*Primary Examiner* — Jerry Wu
(74) *Attorney, Agent, or Firm* — JCIPRNET (57) ABSTRACT

An expansion module is detachably assembled with a portable computer. The expansion module includes a plate member, a supporting plate, a deformable connecting member, and an expansion unit. The supporting plate is pivoted to the plate member to rotate relative to the plate member between an opened position and a closed position. When the supporting plate is in the closed position, the supporting plate and the plate member defines an accommodating space. The deformable connecting member is connected to the plate member. The expansion unit is connected to the plate member through the deformable connecting member. When the supporting plate is in the closed position, the expansion unit is rotated from a first position to a second position by bending the deformable connecting member and is stored in the accommodating space.

17 Claims, 5 Drawing Sheets

(56) References Cited

U.S. PATENT DOCUMENTS

2004/0056843 A1\* 3/2004 Lin .................. G06F 1/1616
  345/168
2005/0052831 A1 3/2005 Chen \* cited by examiner

EXPANSION MODULE AND ELECTRONIC DEVICE

CROSS-REFERENCE TO RELATED APPLICATION

This application claims the priority benefit of Taiwan application serial no. 107114153, filed on Apr. 26, 2018. The entirety of the above-mentioned patent application is hereby incorporated by reference herein and made a part of this specification.

BACKGROUND

Technical Field

The invention relates to an expansion module and an electronic device. More particularly, the invention relates to an expansion module that can be assembled with a portable computer and an electronic device including the expansion module.

Description of Related Art

Nowadays, in the so-called "information explosion era", electronic devices have become an indispensable part of our everyday life. With the continuous advance of technology, electronic devices featuring mobility, lightweight, and simplicity keep hitting the market. The main difference between the portable electronic devices (e.g., tablet computers) and the conventional desktop computers is that the portable electronic devices feature lightweight and compact sizes. In other words, the portable computers may be easily carried around by computer users and allow users to conveniently work on the computers in various environments. Nevertheless, as the portable electronic devices are required to be designed to be light and small, the portable electronic devices provide relatively limited functions and expandability compared to the desktop computers featuring larger sizes for computer operation. In addition, since a portable electronic device can not stand on a desktop by itself, when a user tries to tilt the portable electronic device to stand so as to conveniently view or work on the portable electronic device, the user has to laboriously support the portable electronic device by hands most of the time.

SUMMARY

The invention provides an expansion module which can be detachably assembled with a portable computer, is capable of expanding functions of the portable computer, and features greater convenience for using and a thinner thickness.

The invention further provides an electronic device including the expansion module detachably assembled with the portable computer and that the electronic device can be used more conveniently and easily.

In an embodiment of the invention, an expansion module detachably assembled with a portable computer is provided. The expansion module includes a plate member, a supporting plate, a deformable connecting member, and an expansion unit. The supporting plate is pivoted to the plate member to rotate relative to the plate member between an opened position and a closed position. When the supporting plate is in the closed position, the supporting plate and the plate member defines an accommodating space. The deformable connecting member is connected to the plate member. The expansion unit is connected to the plate member through the deformable connecting member. When the supporting plate is in the closed position, the expansion unit is rotated from a first position to a second position by bending the deformable connecting member and is stored in the accommodating space.

In an embodiment of the invention, the plate member includes a connection notch and an electrical connection portion. The connection notch is located at a side of the plate member relatively away from the supporting plate, and the electrical connection portion is located in the connection notch.

In an embodiment of the invention, the expansion module further includes a flexible circuit board connected between the electrical connection portion and the expansion unit.

In an embodiment of the invention, the deformable connecting member covers the expansion unit, the connection notch of the plate member, and the flexible circuit board.

In an embodiment of the invention, the supporting plate has a receiving notch. When the supporting plate is in the closed position, the expansion unit is located in the receiving notch and is stored in the accommodating space.

In an embodiment of the invention, a thickness of the supporting plate is less than or equal to a thickness of the plate member.

In an embodiment of the invention, an electronic device including a portable computer and an expansion module is provided. The expansion module is detachably assembled with the portable computer. The expansion module includes a plate member, a supporting plate, a deformable connecting member, and an expansion unit. The supporting plate is pivoted to the plate member to rotate relative to the plate member between an opened position and a closed position. When the supporting plate is in the closed position, the supporting plate and the plate member defines an accommodating space. The deformable connecting member is connected to the plate member. The expansion unit is connected to the plate member through the deformable connecting member. When the supporting plate is in the closed position, the expansion unit is rotated from a first position to a second position by bending the deformable connecting member and is stored in the accommodating space.

In an embodiment of the invention, the portable computer includes a first electrical connection portion, the plate member includes a connection notch and a second electrical connection portion. The connection notch is located at a side of the plate member relatively away from the supporting plate, and the second electrical connection portion is located in the connection notch. The portable computer is connected to the second electrical connection portion through the first electrical connection portion and is electrically connected to the expansion module.

In an embodiment of the invention, an expansion module detachably assembled with a portable computer is provided. The expansion module includes a plate member, a deformable connecting member, an expansion unit, and a flexible circuit board. The plate member has a connection notch and an electrical connection portion, and the electrical connection portion is located in the connection notch. The expansion unit is connected to the plate member through the deformable connecting member. The expansion unit is rotated from a first position to a second position by bending the deformable connecting member and is stacked on the plate member. The flexible circuit board is connected between the electrical connection portion and the expansion unit. The deformable connecting member covers the expansion unit, a portion of the connection notch, and a portion of the flexible circuit board.

In an embodiment of the invention, a length of the plate member is greater than or equal to a length of the expansion unit.

In an embodiment of the invention, the expansion module further includes a supporting plate pivoted to an upper end of the plate member.

In an embodiment of the invention, a length of the supporting plate is greater than or equal to a length of the expansion unit.

In an embodiment of the invention, the expansion unit further includes a torsion hinge, and the supporting plate is pivoted to the plate member through the torsion hinge.

In an embodiment of the invention, a thickness of the torsion hinge is greater than or equal to a thickness of the expansion unit and a thickness of the deformable connecting member.

In an embodiment of the invention, the torsion hinge and the connection notch are disposed at different sides of the plate member.

In an embodiment of the invention, the plate member has a lower end, and the connection notch is disposed at the lower end.

In an embodiment of the invention, the electrical connection portion includes a universal serial bus, a pogo pin, a positively and negatively pluggable connecting member, or combinations thereof.

In an embodiment of the invention, the expansion unit includes a keyboard, a speaker, a mobile power band, a drawing board, a touch panel, or combinations thereof.

In an embodiment of the invention, a material of the deformable connecting member includes fabric, plastic, or combinations thereof.

In an embodiment of the invention, an electronic device including a portable computer and an expansion module is provided. The expansion module is detachably assembled with the portable computer. The expansion module includes a plate member, a deformable connecting member, an expansion unit, and a flexible circuit board. The plate member has a connection notch and an electrical connection portion, and the electrical connection portion is located in the connection notch. The expansion unit is connected to the plate member through the deformable connecting member. The expansion unit is rotated from a first position to a second position by bending the deformable connecting member and is stacked on the plate member. The flexible circuit board is connected between the electrical connection portion and the expansion unit. The deformable connecting member covers the expansion unit, a portion of the connection notch, and a portion of the flexible circuit board.

To sum up, in the design of the expansion module provided by the embodiments of the invention, when the supporting plate is in the closed position, the accommodating space is defined by the supporting plate and the plate member. The expansion unit is rotated from a first position to a second position by bending the deformable connecting member and is stored in the accommodating space. In this way, the expansion module provided by the embodiments of the invention may have thinner thickness. In addition, the expansion module provided by the embodiments of the invention is detachably assembled with the portable computer. Therefore, the functions of the portable computer can be expanded through the expansion module, and that the electronic device provided by the embodiments of the invention can be used more conveniently and easily.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
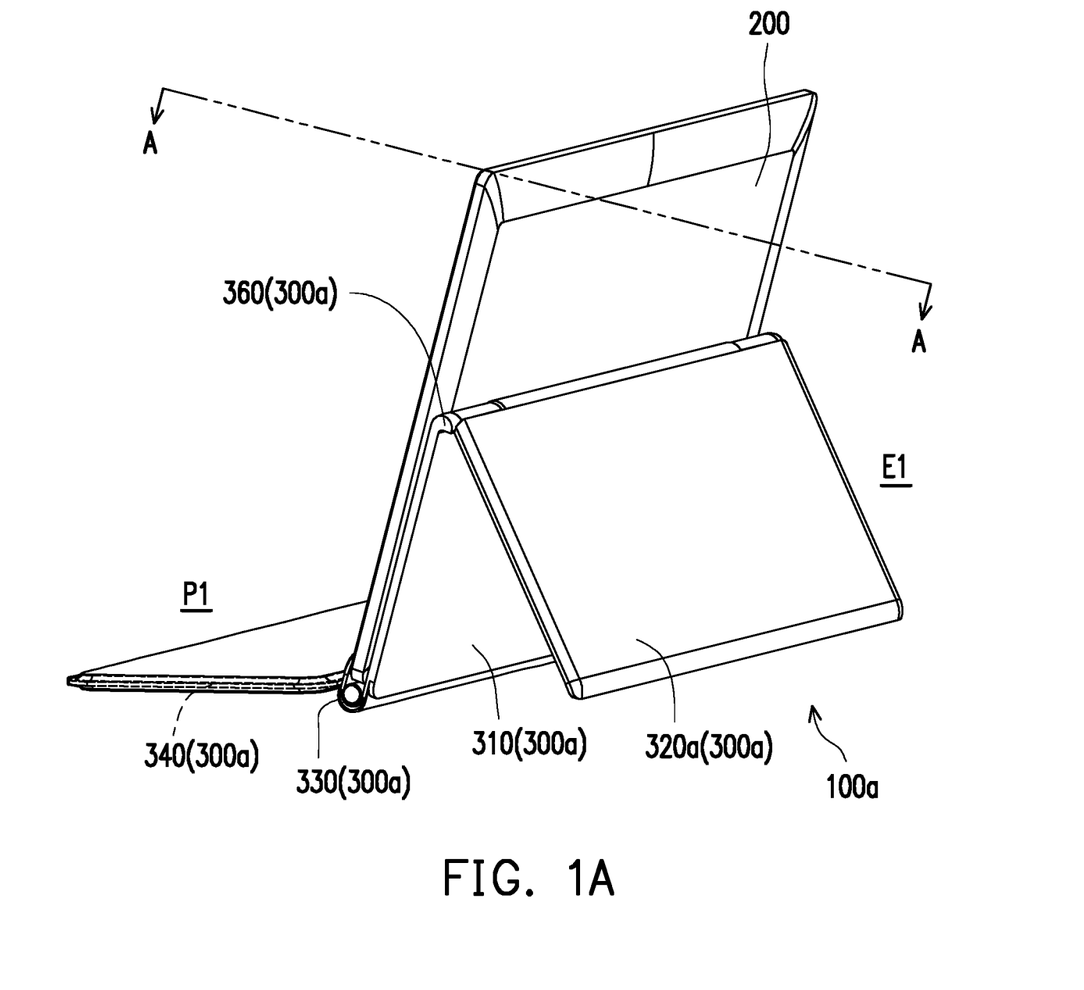
FIG. 1A is a schematic three-dimensional view illustrating an electronic device according to an embodiment of the invention.
Figure 1B:
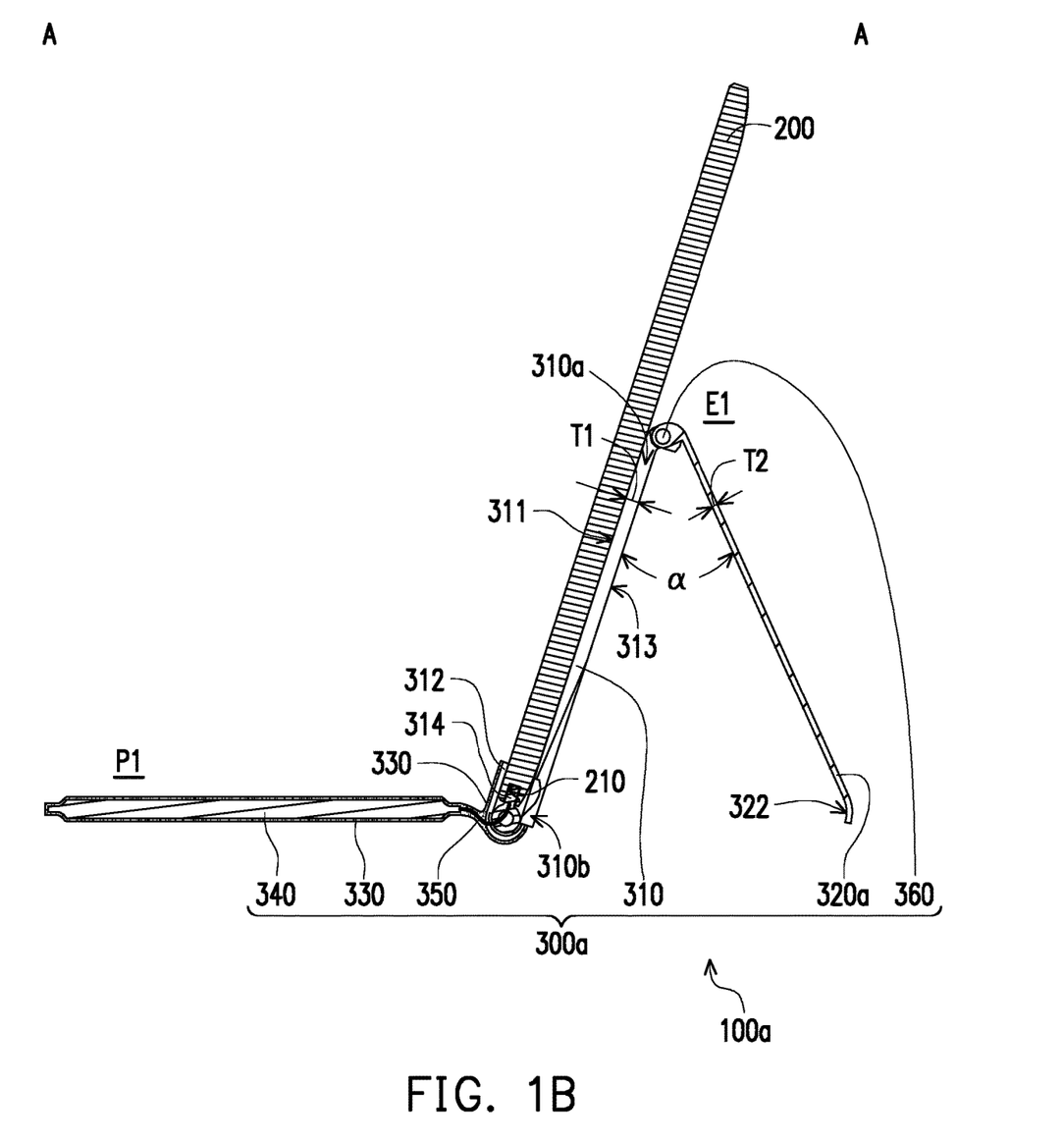
FIG. 1B is a schematic cross-sectional view taken along a line A-A illustrated in 1A.
Figure 1C:
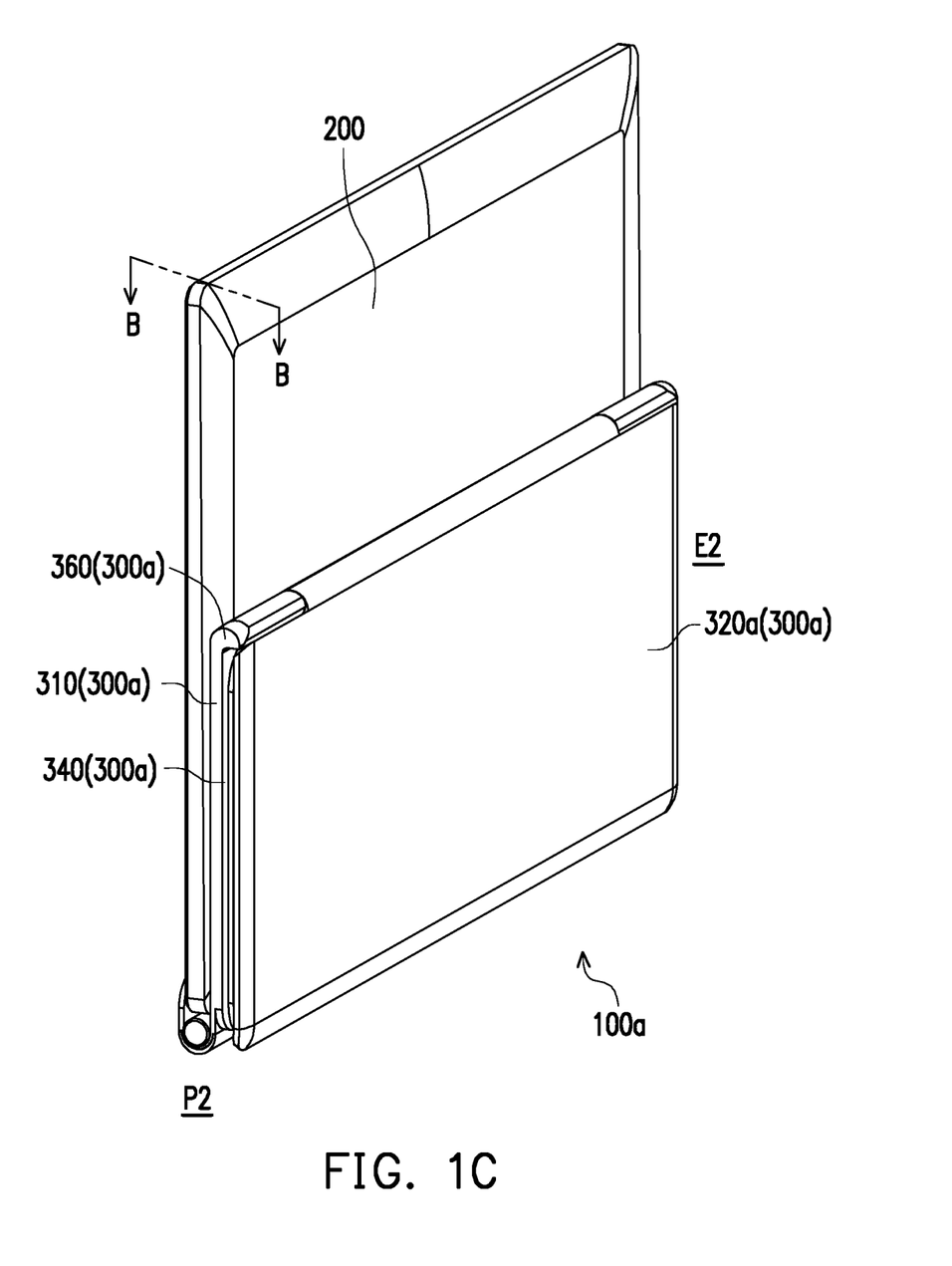
FIG. 1C is a schematic three-dimensional view illustrating a supporting plate of an expansion module of the electronic device of FIG. 1A in a closed position.
Figure 1D:
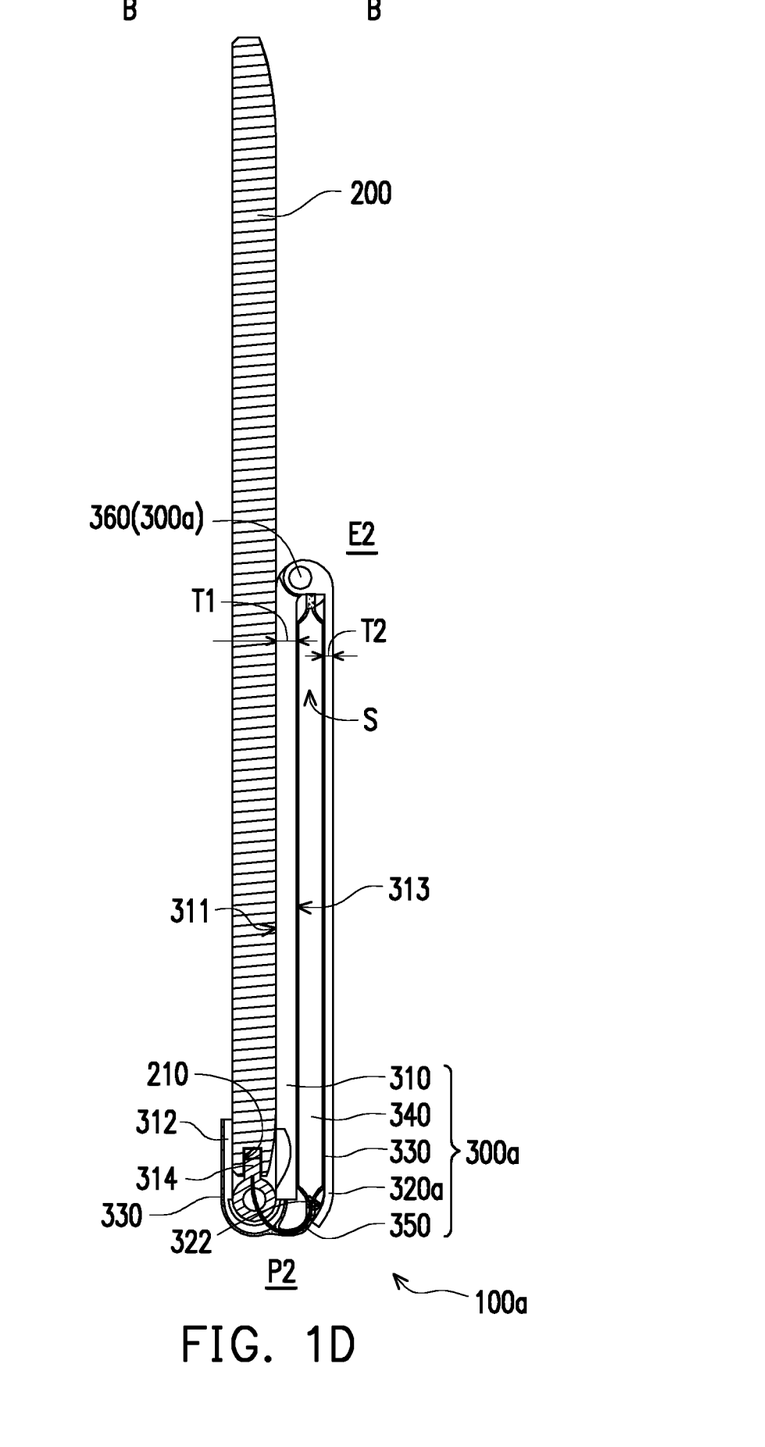
FIG. 1D is a schematic cross-sectional view taken along a line B-B illustrated in FIG. 1C.

FIG. 1A is a schematic three-dimensional view illustrating an electronic device according to an embodiment of the invention. FIG. 1B is a schematic cross-sectional view taken along a line A-A illustrated in 1A. FIG. 1C is a schematic three-dimensional view illustrating a supporting plate of an expansion module of the electronic device of FIG. 1A in a closed position. FIG. 1D is a schematic cross-sectional view taken along a line B-B illustrated in FIG. 1C. For clarity, illustration of a deformable connecting member is omitted in FIG. 1C.

Referring to FIG. 1A, FIG. 1B, FIG. 1C, and FIG. 1D together, in this embodiment, an electronic device 100*a* includes a portable computer 200 and an expansion module 300*a*, wherein the portable computer 200 is, for example, a tablet computer, but is not limited thereto. The expansion module 300*a* of this embodiment is detachably assembled with the portable computer 200, wherein the expansion module 300*a* includes a plate member 310, a supporting plate 320*a*, a deformable connecting member 330, and an expansion unit 340. The supporting plate 320*a* is pivoted to the plate member 310 to rotate relative to the plate member 310 between an opened position E1 and a closed position E2. When the supporting plate 320*a* is in the closed position E2, the supporting plate 320*a* and the plate member 310 defines an accommodating space S. The deformable connecting member 330 is connected to the plate member 310, and the expansion unit 340 is connected to the plate member 310 through the deformable connecting member 330. When the supporting plate 320*a* is in the closed position E2, the expansion unit 340 is rotated from a first position P1 to a second position P2 by bending the deformable connecting member 330 and is stored in the accommodating space S.

To be specific, referring to FIG. 1B and FIG. 1D together, the portable computer 200 of this embodiment includes an electrical connection portion 210, and the plate member 310 includes a connection notch 312 and an electrical connection portion 314. The connection notch 312 is located at a side 311 of the plate member 310 relatively away from the supporting plate 320*a*, and the electrical connection portion 314 is located in the connection notch 312. The portable computer 200 may be connected to the electrical connection portion 314 through the electrical connection portion 210 and is electrically connected to the expansion module 300*a*.

Herein, the electrical connection portion 210 is, for example, a universal serial bus, a pogo pin, a positively and negatively pluggable connector, or combinations thereof. The electrical connection portion 210 is, for example, a female socket, and the electrical connection portion 314 is, for example, a male plug. Certainly, in other embodiments that are not shown, the electrical connection portion 210 may be the male plug and the electrical connection portion 314 is the female socket, which still falls within the scope of the invention seeking to protect. In another aspect, the connection notch 312 is, for example, a U-shaped notch configured for accommodating the electrical connection portion 314 and a portion of the portable computer 200. In this way, the portable computer 200 can be securely assembled with the expansion module 300a. Certainly, in other embodiments that are not shown, the connection notch 312 may also be a notch of other shapes, as long as the notch can accommodate the electrical connection portion 314 and a portion of the portable computer 200, it will be within the scope of the invention seeking to protect. Preferably, a length of the plate member 310 is substantially greater than or equal to a length of the expansion unit 300a, and a length of the supporting plate 320a is substantially greater than or equal to the length of the expansion unit 300a. In addition, the supporting plate 320a of this embodiment is embodied as an upper end 310a pivoted to the plate member 310, and the connection notch 312 is embodied as a lower end 310b disposed at the plate member 310.

Further, the expansion module 300a of this embodiment further includes a flexible circuit board 350. The flexible circuit board 350 is connected between the electrical connection portion 314 and the expansion unit 340, and the portable computer 200 may be electrically connected to the expansion unit 340 sequentially through the electrical connection portion 210, the electrical connection portion 314, and the flexible circuit board 350. Herein, the expansion unit 340 is, for example, a keyboard, a speaker, a mobile power band, a drawing board, a touch panel, or combinations thereof, but is not limited thereto. In addition, the deformable connecting member 330 of this embodiment covers the expansion unit 340, a portion of the connection notch 312 of the plate member 310, and a portion of the flexible circuit board 350. The deformable connecting member 330 is a soft or elastic cladding material made of, for example, fabric, plastic, or combinations thereof. The fabric is, for example, leather, and the plastic is, for example, silicone rubber or rubber, but is not limited thereto. In other words, the expansion unit 340 of this embodiment may be connected to the plate member 310 through the deformable connecting member 330 instead of through a pivoting method.

In addition, the expansion module 300a of this embodiment further includes a torsion hinge 360, and the supporting plate 320a is pivoted to the plate member 310 through the torsion hinge 360. Herein, the torsion hinge 360 and the connection notch 312 are disposed at different sides of the plate member 310. Further, a thickness of the torsion hinge 360 is greater than or equal to a thickness of the expansion unit 340 and a thickness of the deformable connecting member 330.

With reference to FIG. 1B and FIG. 1D again, the supporting plate 320a of this embodiment has a receiving notch 322. When the supporting plate 320a is in the closed position E2, the expansion unit 340 is located in the receiving notch 322 and is stored in the accommodating space S. Since the supporting plate 320a is designed to include the receiving notch 322, the supporting plate 320a may accommodate a thickness of a portion of the expansion unit 340.

Figure 2:
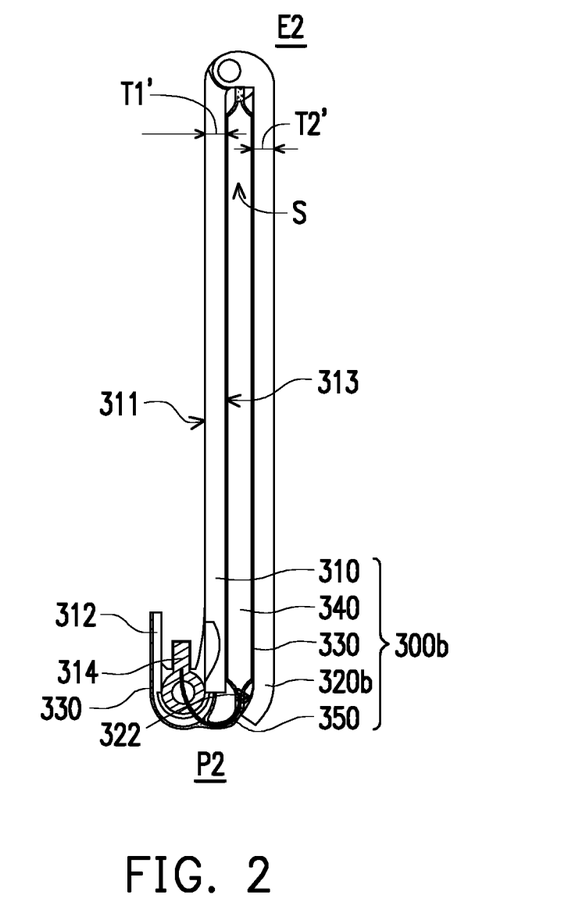
FIG. 2 is a schematic cross-sectional view illustrating an expansion module according to an embodiment of the invention.

In this case, when the supporting plate 320a is in the closed position E2, a thickness of the entire expansion module 300a may be reduced. Herein, a thickness T2 of the supporting plate 320a is embodied to be substantially less than a thickness T1 of the plate member 310, as such, the thickness of the entire expansion module 300a may be reduced. Certainly, referring to FIG. 2, a thickness T2' of a supporting plate 320b of an expansion module 300b may also be equal to a thickness T1' of the plate member 310 in other embodiments. In this case, structural strength of the supporting plate 320b in the opened position E1 can be enhanced, so as to increase supporting capability of the supporting plate 320b.

Referring to FIG. 1A and FIG. 1B together, when a user intends to expand functions of the portable computer 200 through the expansion module 300a, the user may enable the supporting plate 320a of the expansion module 300a to rotate relative to the plate member 310 to the opened position E1. In this way, the expansion unit 340 of the expansion module 300a is located at a first position P1 (e.g., being lain on a desktop) for the user to use. At the moment, as shown by FIG. 1B, the supporting plate 320a and the plate member 310 may enable the portable computer 200 to stand. An angle α is provided between the supporting plate 320a and the plate member 310, and the angle α may be adjusted by the user himself/herself, as such, when viewing on the portable computer 200, the user may enjoy a favorable viewing angle.

Referring to FIG. 1C and FIG. 1D together, when the user no longer uses the expansion module 300a, the expansion unit 340 may be rotated from the first position P1 to the second position P2 by bending the deformable connecting member 330 and is stored in the accommodating space S defined by the plate member 310 and the supporting plate 320a. At this moment, when the supporting plate 320a is in the closed position E2, since the receiving notch 322 of the supporting plate 320a may accommodate a thickness of a portion of the expansion unit 340, the thickness of the entire expansion module 300a may be reduced.

In short, in the design of the electronic device 100a of this embodiment, since the expansion module 300a is detachably assembled with the portable computer 200, the expansion module 300a allows the user to expand the functions of the portable computer 200 at any time and is able to provide greater convenience for using. Further, the expansion module 300a of this embodiment not only enables the portable computer 200 to stand for delivering a favorable viewing angle for the user but also provides the function of storing the expansion unit 340, as such, the overall thickness and volume can be effectively reduced. In addition, the plate member 310 and the expansion unit 340 of the expansion module 300a are connected through the deformable connecting member 330, and in this way, favorable flexibility is provided.

In view of the foregoing, in the design of the expansion module provided by the embodiments of the invention, when the supporting plate is in the closed position, the accommodating space is defined by the supporting plate and the plate member, and the expansion unit may be rotated from the first position to the second position by bending the deformable connecting member and is stored in the accommodating space. In this way, the expansion module provided by the embodiments of the invention may have thinner thickness. In addition, the expansion module provided by the embodiments of the invention is detachably assembled with the portable computer. Therefore, the functions of the portable computer can be expanded through the expansion module, and that the electronic device provided by the embodiments of the invention can be used more conveniently and easily.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An expansion module, detachably assembled with a portable computer, the expansion module comprising: a plate member; a supporting plate, pivoted to the plate member through a hinge to rotate relative to the plate member between an opened position and a closed position, wherein when the supporting plate is in the closed position, the supporting plate and the plate member defines an accommodating space; a deformable connecting member, connected to the plate member; and an expansion unit, connected to the plate member through the deformable connecting member, wherein when the supporting plate is in the closed position, the expansion unit is rotated from a first position to a second position by bending of the deformable connecting member and is stored in the accommodating space, wherein the supporting plate has a receiving notch formed by a space area on an end opposite to the hinge, and when the supporting plate is in the closed position, the expansion unit is located in the receiving notch and is stored in the accommodating space.

2. The expansion module as claimed in claim 1, wherein the plate member comprises a connection notch and an electrical connection portion, the connection notch is located at a side of the plate member relatively away from the supporting plate, and the electrical connection portion is located in the connection notch.

3. The expansion module as claimed in claim 2, further comprising:
a flexible circuit board, connected between the electrical connection portion and the expansion unit.

4. The expansion module as claimed in claim 3, wherein the deformable connecting member covers the expansion unit, the connection notch of the plate member, and the flexible circuit board.

5. The expansion module as claimed in claim 1, wherein a thickness of the supporting plate is less than or equal to a thickness of the plate member.

6. An electronic device, comprising: a portable computer; and an expansion module, detachably assembled with the portable computer, the expansion module comprising: a plate member; a supporting plate, pivoted to the plate member through a hinge to rotate relative to the plate member between an opened position and a closed position, wherein when the supporting plate is in the closed position, the supporting plate and the plate member defines an accommodating space; a deformable connecting member, connected to the plate member; and an expansion unit, connected to the plate member through the deformable connecting member, wherein the supporting plate has a receiving notch formed by a space area on an end opposite to the hinge, and wherein when the supporting plate is in the closed position, the expansion unit is rotated from a first position to a second position by bending the deformable connecting member, the expansion unit is located in the receiving notch and is stored in the accommodating space.

7. The electronic device as claimed in claim 6, wherein the portable computer comprises a first electrical connection portion, the plate member comprises a connection notch and a second electrical connection portion, the connection notch is located at a side of the plate member relatively away from the supporting plate, the second electrical connection portion is located in the connection notch, and the portable computer is connected to the second electrical connection portion through the first electrical connection portion and is electrically connected to the expansion module.

8. An expansion module, detachably assembled with a portable computer, the expansion module comprising: a plate member, having a connection notch and an electrical connection portion, the electrical connection portion being located in the connection notch; a deformable connecting member; an expansion unit, connected to the plate member through the deformable connecting member, wherein the expansion unit is rotated from a first position to a second position by bending of the deformable connecting member and is stacked on the plate member; a supporting plate having a spaced notch on one end, pivoted to an upper end of the plate member through a hinge on an opposite end, and a length of the supporting plate is greater than or equal to a length of the expansion unit in a direction from the hinge to the spaced notch; and a flexible circuit board, connected between the electrical connection portion and the expansion unit, wherein the deformable connecting member covers the expansion unit, a portion of the connection notch, and a portion of the flexible circuit board.

9. The expansion module as claimed in claim 8, wherein a length of the plate member is greater than or equal to a length of the expansion unit.

10. The expansion module as claimed in claim 8, further comprising:
a torsion hinge, the supporting plate being pivoted to the plate member through the torsion hinge.

11. The expansion module as claimed in claim 10, wherein a thickness of the torsion hinge is greater than or equal to a thickness of the expansion unit and a thickness of the deformable connecting member.

12. The expansion module as claimed in claim 10, wherein the torsion hinge and the connection notch are disposed at different sides of the plate member.

13. The expansion module as claimed in claim 8, wherein the plate member has a lower end, and the connection notch is disposed at the lower end.

14. The expansion module as claimed in claim 8, wherein the electrical connection portion comprises a universal serial bus, a pogo pin, a positively and negatively pluggable connecting member, or combinations thereof.

15. The expansion module as claimed in claim 8, wherein the expansion unit comprises a keyboard, a speaker, a mobile power band, a drawing board, a touch panel, or combinations thereof.

16. The expansion module as claimed in claim 8, wherein a material of the deformable connecting member comprises fabric, plastic, or combinations thereof.

17. An electronic device, comprising: a portable computer; and an expansion module, detachably assembled with the portable computer, the expansion module comprising: a plate member, having a connection notch and an electrical connection portion, the electrical connection portion being located in the connection notch; a deformable connecting m ember; an expansion unit, connected to the plate member through the deformable connecting member, wherein the expansion unit is rotated from a first position to a second position by bending the deformable connecting member and is stacked on the plate member; a supporting plate having a spaced notch on one end, pivoted to an upper end of the plate member through a hinge on an opposite end, and a length of the supporting plate is greater than or equal to a length of the expansion unit in a direction from the hinge to the spaced notch; and a flexible circuit board, connected between the electrical connection portion and the expansion unit, wherein the deformable connecting member covers the expansion unit, a portion of the connection notch, and a portion of the flexible circuit board.

* * * * *